United States Patent
Moniz et al.

(10) Patent No.: US 9,452,519 B2
(45) Date of Patent: Sep. 27, 2016

(54) HANDLING DEVICE ATTACHMENT TOOL

(71) Applicant: Toyota Motor Engineering & Manufacturing North America, Inc., Erlanger, KY (US)

(72) Inventors: Kerry S. Moniz, Dorchester (CA); Curtis V. Cushing, Burgessville (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 260 days.

(21) Appl. No.: 14/163,819

(22) Filed: Jan. 24, 2014

(65) Prior Publication Data

US 2015/0209957 A1    Jul. 30, 2015

(51) Int. Cl.
B25J 1/04    (2006.01)
B25F 1/00    (2006.01)
B25J 1/00    (2006.01)

(52) U.S. Cl.
CPC ... *B25F 1/00* (2013.01); *B25J 1/00* (2013.01)

(58) Field of Classification Search
CPC ................. B25F 1/00; B25J 1/04; B25J 1/12
USPC .............................................. 7/138, 166, 161
See application file for complete search history.

(56) References Cited

U.S. PATENT DOCUMENTS

| | | | |
|---|---|---|---|
| 441,979 A * | 12/1890 | Rohrbach et al. | B25F 1/00 7/138 |
| 1,445,263 A | 2/1923 | Asper | |
| 4,625,353 A * | 12/1986 | Tamez | B60T 17/221 7/138 |
| 5,181,440 A * | 1/1993 | Jagt | B60T 17/221 7/164 |

OTHER PUBLICATIONS

Wood's Powr-Grip Co., Inc., "Rotate and Tilt Hand Cup Frames" Product Spec Sheet 2-1, Rev 0.5, Apr. 2012 in 1 page.

* cited by examiner

*Primary Examiner* — Hadi Shakeri
(74) *Attorney, Agent, or Firm* — Christopher G. Darrow; Darrow Mustafa PC

(57) ABSTRACT

A tool includes a handle that defines an axis, a stabilizer mounted along a length of the handle and a hook mounted to the handle, the hook angled with respect to the handle.

18 Claims, 4 Drawing Sheets

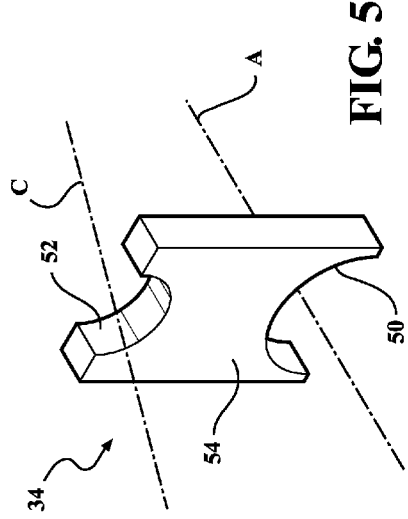
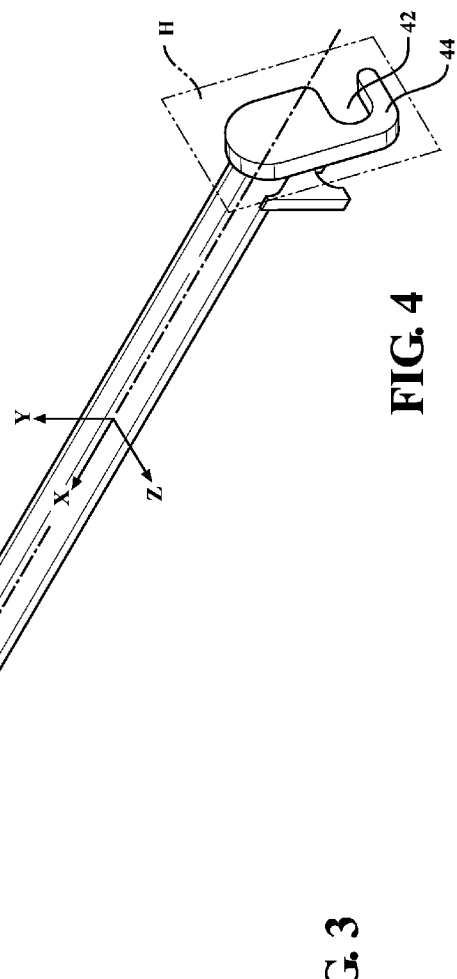
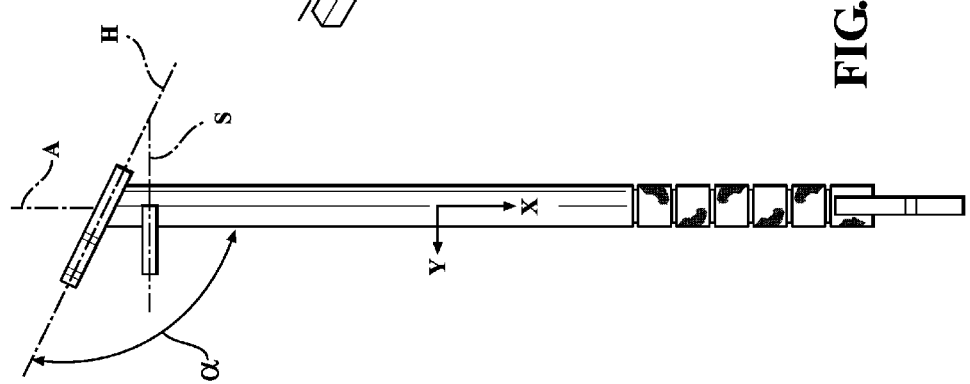
FIG. 3
FIG. 4
FIG. 5

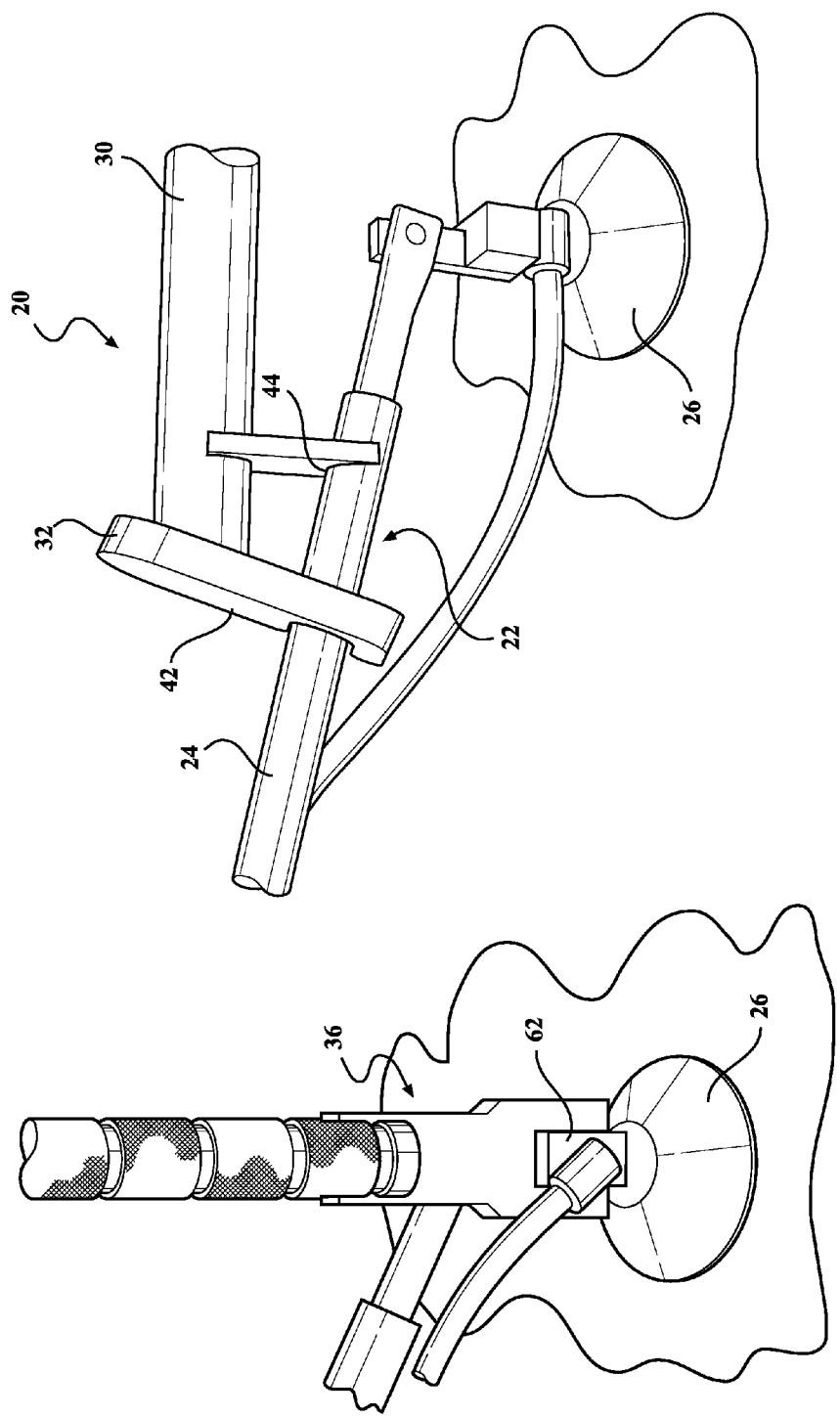

HANDLING DEVICE ATTACHMENT TOOL

BACKGROUND

The present disclosure relates generally to material handling systems and more particularly to a tool to facilitate the position of handling device attachments.

End of arm tooling such as handling device attachments with vacuum cups are often utilized to move material within a die press or other material handling environment. To provide application force and additional reach for an operator to position the handling device attachment at a desired position upon a workpiece, a handling device attachment tool engageable with the handling device attachment is often utilized.

Although operable, current handling device attachment tools are fork type devices with two prongs perpendicular to a handle that require two-handed operation for attachment and movement of the handling device attachment. The current handling device attachment tools may be relatively prone to slippage and rotation relative to the handling device attachment when the handling device attachment is being moved and when downward force is applied as necessary to initiate operation of the vacuum cup.

Current handling device attachment tools are thus quite dependent upon the skill and experience of the operator, which may slow effective material handling.

SUMMARY

A tool according to one disclosed non-limiting embodiment of the present disclosure includes a handle that defines an axis; a stabilizer mounted along a length of the handle; and a hook mounted to the handle, the hook angled with respect to the handle.

A tool according to another disclosed non-limiting embodiment of the present disclosure includes a handle that defines an axis; a stabilizer mounted along a length of the handle; a hook mounted to the handle, the hook defines a slot displaced from the handle.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 3 is a side perspective view of the handling device attachment tool;

FIG. 4 is a top perspective view of a handling device attachment tool;

FIG. 5 is an expanded perspective view of a stabilizer plate of the handling device attachment tool;

FIG. 6 is a perspective view of a wrench of the handling device attachment tool attached to a vacuum cup; and FIG. 7 is an expanded perspective view of a handling device attachment tool engaged with a handling device attachment.

DETAILED DESCRIPTION

Figure 1:
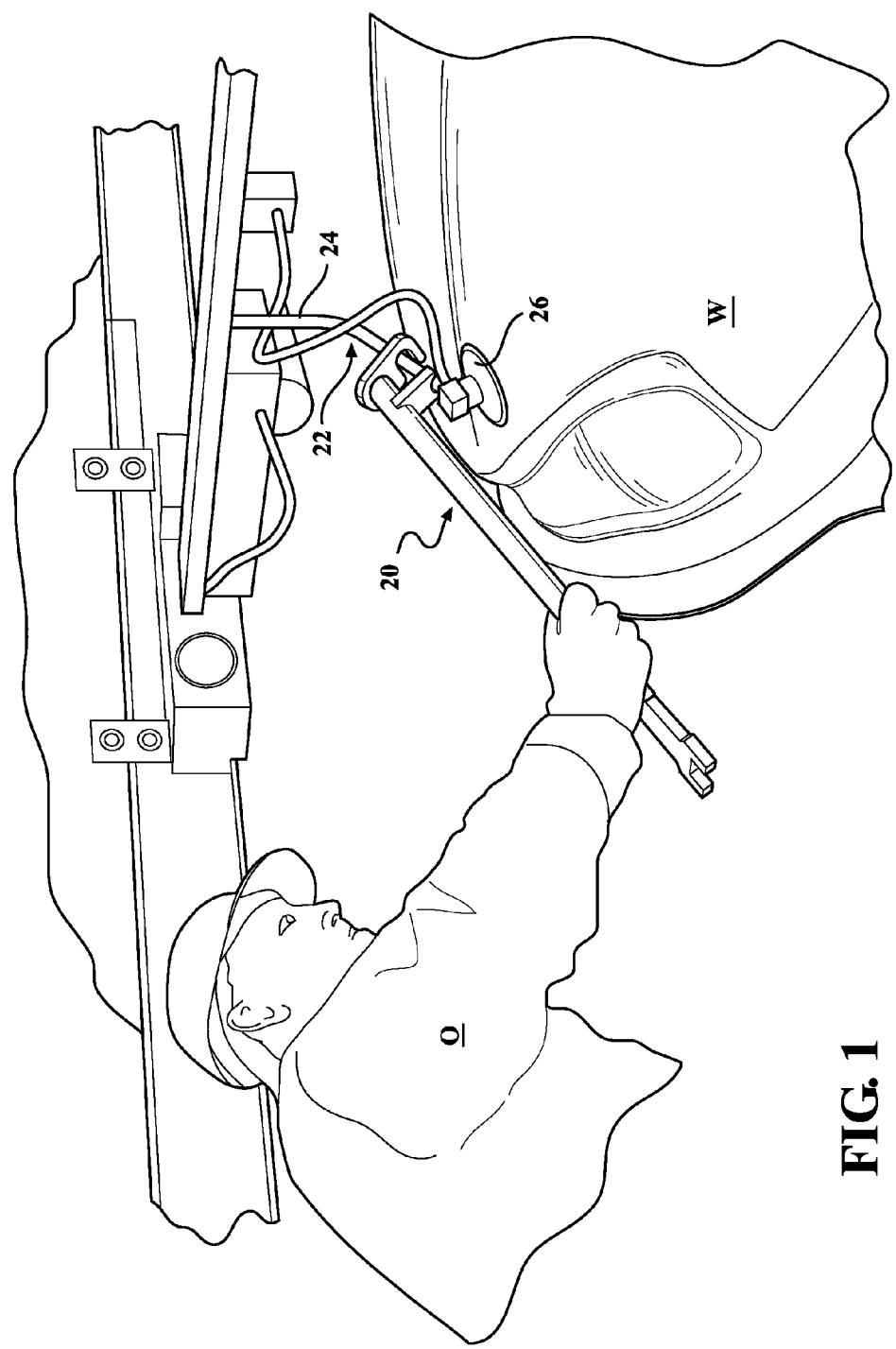
FIG. 1 is a perspective view of a handling device attachment tool to facilitate positioning of a handling device attachment by an operator.

FIG. 1 schematically illustrates a handling device attachment tool 20 to facilitate positioning of a handling device attachment 22. One example handling device attachment 22 includes a body 24 and at least one vacuum cup 26 operable for handling of material W such as a car body panel. It should be appreciated that various machines such as relatively large stamping dies utilize end of arm tooling with multiple handling device attachments 22 that engage the material W via the vacuum cup 26 for automated handling of the material W. In some instances, however, one or more handling device attachments 22 may need to be manually adjusted by an operator O. In such instances, the handling device attachment tool 20 readily increases leverage and reach of the operator O to accurately reposition the handling device attachment 22.

Figure 2:
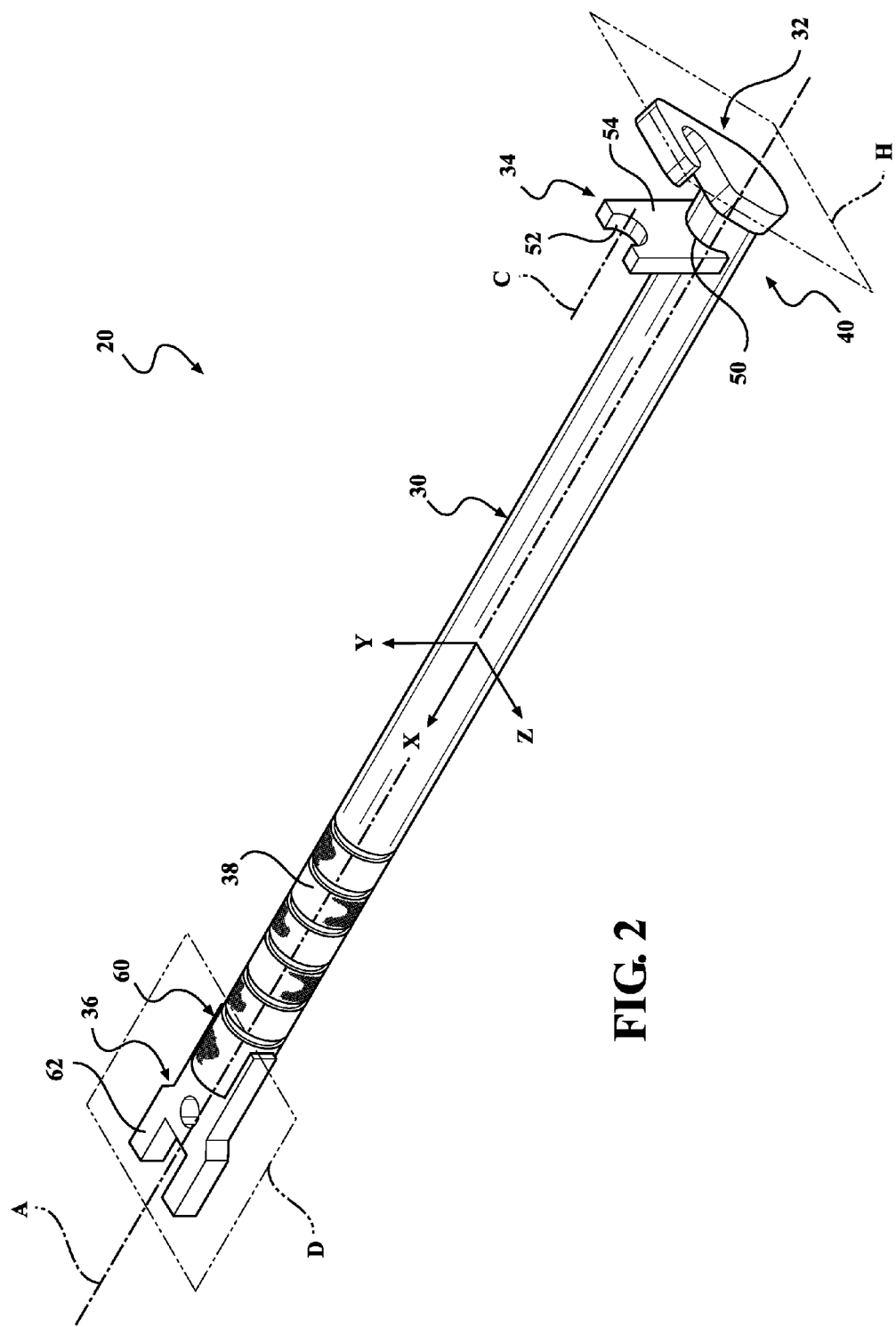
FIG. 2 is a bottom perspective view of a handling device attachment tool.

With reference to FIG. 2, the handling device attachment tool 20 generally includes a handle 30, a hook 32, a stabilizer 34 and a wrench end 36. It should be appreciated that although each component is identified separately, the handling device attachment tool 20 may include alternative or additional components manufactured individually or integrally.

The handle 30 is defined along an axis A and includes a knurled portion 38 to increase grip for the operator. The knurled portion 38 is generally opposite an end section 40. Although illustrated as circular in cross-section, the handle 30 may be of other cross-section such as rectilinear, hexagonal and others.

The hook 32 is mounted to the end section 40 of the handle 30 and transverse thereto such that the hook 32 defines a plane H though which the axis A extends. In other words, in an X-Y-Z coordinate system, the A axis is the X-axis and the plane H is in the Y-Z plane but angled therefrom. In one disclosed non-limiting embodiment, a distal end of the handle 30 is angled at an angle α of about sixty-three (63) degrees (FIG. 3) such that the plane H of the hook 32 is angled away from the stabilizer 34. The hook 32 defines a generally U-shaped slot 42 in a plate 44 thereof that is within plane H, angled relative to the axis A and open perpendicular to the handle 30 (FIG. 4). That is, the slot 42 includes an open end that extends through a side of the plate 44 relative to the handle 30. In other words, in the X-Y-Z coordinate system, the A axis is the X axis and the generally U-shaped slot 42 extends in the Z direction. The hook 32 may be mounted to the handle 30 via welding, fasteners or other techniques.

The stabilizer 34 is mounted along the length of the handle 30 toward the end section 40 and defines a plane S perpendicular to the axis A (also shown in FIG. 3). In this disclosed non-limiting embodiment, the stabilizer 34 includes a first arcuate cut 50 and an opposed second arcuate cut 52 within a plate 54 that may be about 0.5 inches (12.5 mm) thick. The first arcuate cut 50 is generally of a radius equivalent to that of the handle 30 such that the stabilizer 34 may be readily welded or otherwise attached thereto perpendicular to the axis A. The second arcuate cut 52 in this disclosed non-limiting embodiment, is of a radius smaller than that of the first arcuate cut 50 about an axis C non-parallel to that of axis A (FIG. 5). Axis C is thereby biased toward the axis A and the hook 32.

The wrench end 36 is mounted to an end section 60 opposite the end section 40 and defines a plane D though which the axis A passes. That is, the wrench end 36 is perpendicular to the stabilizer 34. The wrench end 36 includes a generally rectilinear wrench slot 62 that provides engagement with, for example, the vacuum cup 26 of the handling device attachment 22 (FIG. 6). It should be appreciated that other tool ends may be provided such as a socket.

With reference to FIG. 7, in operation, the handle 30 of the handling device attachment tool 20 is utilized to engage the U-shaped slot 42 of the hook 32 onto the body 24 of the handling device attachment 22. The handling device attachment 22 may then be lifted such that the body 24 of the handling device attachment 22 pivots about the hook 32 and is received into the second arcuate cut 52 of the stabilizer 34. The handling device attachment 22 is thereby readily engaged with the handling device attachment 22 and may be moved with but one hand of the operator.

The handling device attachment tool 20 thereby essentially self-aligns and engages with the handling device attachment 22 to facilitate position of the handling device attachment 22 that minimizes—if not eliminates—rotation of the handling device attachment 22 and potential damage to the workpiece.

It should be understood that relative positional terms such as "forward," "aft," "upper," "lower," "above," "below," and the like are with reference to the normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A tool, comprising:
   a handle that defines an axis;
   a hook mounted to the handle, wherein the hook is a plate mounted to a distal end of the handle, and defines a plane through which the axis of the handle extends, with the distal end of the handle being angled such that the hook is angled with respect to the handle away from the handle; and
   a stabilizer mounted along a length of the handle, wherein the stabilizer extends from the handle such that the hook is angled away from the stabilizer, and includes a first and a second arcuate cut, the first arcuate cut generally equivalent to a diameter of the handle.

2. The tool as recited in claim 1, wherein the distal end of the handle is angled at an angle of about sixty-three (63) degrees with respect to the axis of the handle.

3. The tool as recited in claim 1, wherein the second arcuate cut is smaller than the first arcuate cut.

4. The tool as recited in claim 3, wherein the first arcuate cut is defined about an axis parallel to the axis of the handle, and the second arcuate cut is defined about an axis non-parallel to the axis of the handle.

5. The tool as recited in claim 1, further comprising a wrench end mounted to the handle opposite the hook.

6. A tool, comprising:
   a handle that defines an axis;
   a hook mounted to the handle, the hook defining a slot displaced from the handle; and
   a stabilizer mounted along a length of the handle in opposition to the hook, wherein the stabilizer is a plate that extends perpendicularly from the handle such that the hook is angled away from the stabilizer, the stabilizer including a first arcuate cut generally equivalent to a diameter of the handle, and a second arcuate cut displaced from the handle.

7. The tool as recited in claim 6, wherein the hook is a plate angled at an angle of about sixty-three (63) degrees with respect to the axis of the handle.

8. The tool as recited in claim 6, wherein the second arcuate cut is smaller than the first arcuate cut.

9. The tool as recited in claim 6, wherein the first arcuate cut is defined about an axis parallel to the axis of the handle, the second arcuate cut defined about an axis non-parallel to the axis of the handle.

10. The tool as recited in claim 6, wherein the hook includes a plate with a generally U-shaped slot in a side of the plate relative to the handle.

11. The tool as recited in claim 6, further comprising a wrench end mounted to the handle opposite the hook.

12. The tool as recited in claim 11, wherein the wrench end extends along the axis of the handle.

13. A tool, comprising:
   a handle that defines, in an X-Y-Z coordinate system, an axis along the X-axis;
   a hook mounted to the handle, the hook defining a plane angled from the Y-Z plane about the Z-axis, and including a slot within the plane, the slot displaced from the handle and opening perpendicularly to the handle in the Z-direction; and
   a stabilizer mounted to the handle in spaced opposition to the hook, the stabilizer including a first arcuate cut generally equivalent to a diameter of the handle, at which the stabilizer is mounted to the handle, and a second arcuate cut displaced from the handle and opening toward the handle in the Y-direction.

14. The tool as recited in claim 13, wherein the plane of the hook is angled away from the stabilizer.

15. The tool as recited in claim 13, wherein the plane of the hook is angled about sixty-three (63) degrees with respect the axis of the handle.

16. The tool as recited in claim 13, wherein the slot is generally U-shaped.

17. The tool as recited in claim 13, wherein the first arcuate cut is defined about an axis parallel to the axis of the handle, and the second arcuate cut is defined about an axis non-parallel to the axis of the handle.

18. The tool as recited in claim 13, further comprising a wrench end mounted to the handle opposite the hook.

* * * * *